Sept. 27, 1932.　　　　A. HAINLEN　　　　1,879,212
APPARATUS FOR COOKING OR FRYING
Filed Dec. 16, 1929
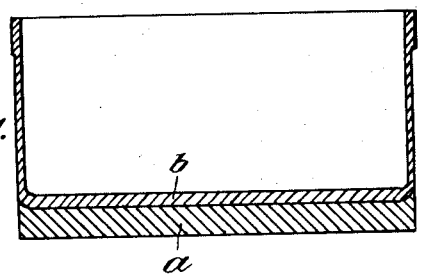
Fig. 1.
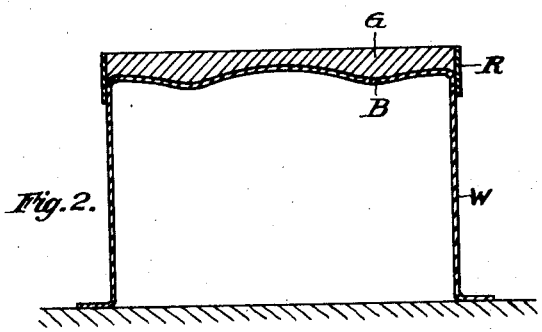
Fig. 2.
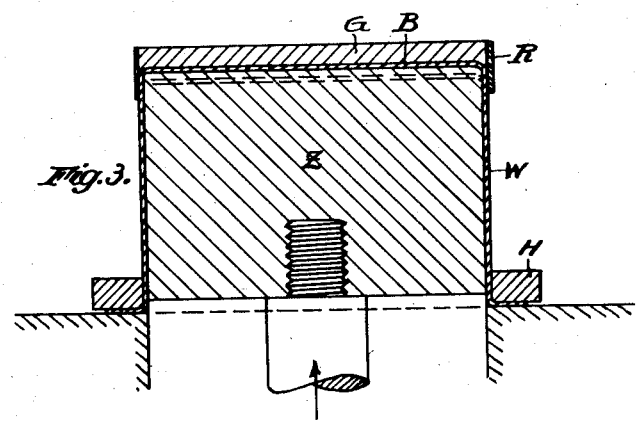
Fig. 3.
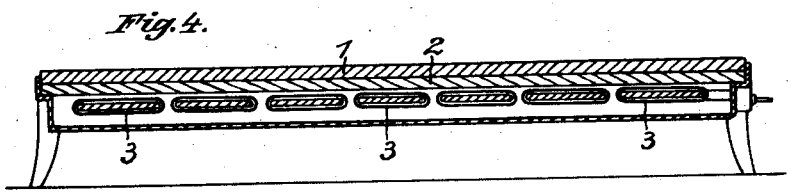
Fig. 4.
Inventor:
Adolf Hainlen,
by 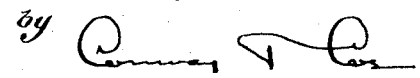
Att'y.

UNITED STATES PATENT OFFICE

ADOLF HAINLEN, OF GEISLINGEN-STEIGE, GERMANY

APPARATUS FOR COOKING OR FRYING

Application filed December 16, 1929, Serial No. 414,543, and in Germany December 22, 1928.

This invention relates to apparatus for cooking or frying and the like, the main object being to produce means for improving the heat transfer.

The invention provides means for subduing the warping or bulging of a heat emitting and heat receiving surface respectively, or both, so as to insure possibly perfect surface contact between both for better heat transfer, for instance, from a hot-plate to the metal pot or container holding the matter to be cooked.

Heat transfer from a hot plate or stove is best when the bottom of the container has full surface contact with the hot plate. With previous utensils of the type considered such full contact is only found when the appliance is cold. Heating it will cause certain deformation to take place which makes impossible the perfect contact between the bottom of the container and the stove or hot plate.

Such deformations are due to the fact that the parts when heated will expand more or less, according to the coefficient of thermal expansion of the metal.

The bottom of a pot has the tendency to expand while being heated, it is restrained however by the rigid walls of the pot and forced to bulge or warp.

The outside of the bottom portion is naturally heated up quicker and more intensely than the inside, which has contact with the food, hence the bottom portion will ordinarily bulge outwardly and out of its original plane. The outward bulging is particularly undesirable, as the pot then only rests upon a central portion of the bottom while the large remaining annular portion does not touch the hot-plate. Moreover, due to the mere local contact the food may become easily burned. Such bulging however appears more or less in all customary previous metal pots.

With ordinary stoves or hot-plates, especially referring to the electric hot-plates, there is observed a deformation in the surface of the plate also due to the thermal effects, so that the bottom of the pot to be heated will not touch the plate by its full face, even under the assumption that the shape of the bottom remains the same. The bulging of the plate is due to the fact that the lower face, i. e. the one proximate to the heating elements, is subjected to a higher expansion than the upper face, thus creating internal stresses in the plate.

According to the invention this trouble may be obviated by composing the bottom of a pot, or the plate of a stove, of at least two layers of different metals, fixed and nonshiftable against each other and of such properties that the layer nearest to the source of heat will have a coefficient of expansion smaller than the layer on the far side. With proper choice of the thicknesses undue expansion is substantially eliminated and thermal deformation will not occur to any considerable extent.

A special method of procedure according to the invention serves to join the two layers which are to make up the bottom of a pot, by casting one layer on top of the other. Special precaution is taken to prevent the bottom from warping while the casting is being done, the details of the process being described below.

Other features and details will appear hereinafter.

An embodiment of the invention is diagrammatically shown in the drawing of which Fig. 1 is an elevational section of the novel container.

Fig. 2 and Fig. 3 disclose a special method for producing the novel appliance.

Fig. 4 shows an electric hot-plate with a compensation outfit according to the invention.

In Fig. 1 "$a$" indicates the outer metal layer of the novel pot or container, having a relatively small specific thermal expansion. The character "$b$" indicates the inner layer and the walls. The layer "$b$" on the far side from the heating element consists of a metal having a specific expansion larger than that of layer "$a$".

It is of particular advantage to use noncorroding steel for the wall and the inner layer "$b$", and cast iron for the outer layer "a", to counterbalance deformations of the steel bottom.

The coefficient of thermal expansion for noncorroding steel i. e. the inner layer of the bottom, is:

$$15 \times 10^{-6} \text{ to } 17 \times 10^{-6}$$

and for cast iron i. e. the outer layer:

$$11 \times 10^{-6} \text{ to } 13 \times 10^{-6}$$

Siemens-Martin steel may also be associated with an outer cast iron layer, the coefficient of S. M.-steel being: ($12 \times 10^{-6}$ to $13 \times 10^{-6}$) i. e. larger than the one of cast iron ($11 \times 10^{-6}$).

These metals are taken for example and do not exclude the use and combination of such others as will produce the same effect, the only requirement being that the outer bottom portion may have the smaller coefficient, and that the thicknesses be such as to react upon each other in the desired manner to prevent deformation.

Upon heating the novel appliance the lower layer of the bottom due to the lower coefficient, will expand relatively little; yet to an amount that will cause a small outward bulge, when assuming that the lower layer solely were to form the bottom. As soon as the heat is conducted to the upper layer of the bottom having the larger coefficient, this layer will have the tendency to expand to a higher degree than the associated layer having the smaller coefficient.

Through proper choice of the ratio of thicknesses it is possible to control the expansion, that is to say the compensation between the two bottom layers, to such a degree as is desirable for the purpose in question. By such compensation a condition can be reached, where the bottom fairly maintains its plane face in cold as well as in heated state. Frequently a slight bulging inwardly will be favored. Such slight inward bulging is comparatively harmless and may be considered even advantageous in case the plate itself has the tendency to curve out somewhat to the convex so as to coincide with the possible bulging of the pot or container.

From the above can be readily seen that there must be no play between the two layers, inasmuch as such relative motion would nullify the mutual reaction between the two metals.

It is suitable to unite both layers together by using castable material for an outer layer and casting the same upon the inner layer. With such practice however the portion of the metal underlying the casting is liable to sag through or warp and this will be the more aggravated the smaller the thickness of said underlying metal. The reason for such behavior is found in the phenomenon that the molten metal when being cast heats up the underlying material which consequently expands, while the unaffected portion of the wall will heavily obstruct such expansion, thus causing the heated portion to bulge out or warp. Having cooled off the cast will have become solidified and united with said underlying portion of the wall, and so will not permit the bulge to recede to its original plane.

The procedure of casting is illustrated in the Fig. 2 and Fig. 3, the character W indicating the wall of the pot or blank upside down. The bottom B is reinforced by the layer of cast material G. In order to hold the cast, a crown or collar R is placed upon the blank body and may be of identical or some different metal as the blank. This collar may become united with the cast or may represent a detachable mould.

In order to prevent the warping as per Fig. 2 of the bottom B the blank body is to be subjected to the pressure of a die Z while the metal is being cast, said die to act in the direction of the arrow as shown and accurately fitted to the cross section of the blank body. When the layer is cast and the bottom B expands, the die Z is allowed to raise the bottom B from its original position (shown in dot and dash) to the position as shown in full. In this manner the die will cause the bottom expansion or the warp to stretch into the wall, and the bottom proper to remain perfectly plane. The stroke or movement of the die Z is suitably limited so as not to tear open the bottom when hot. The die is to be kept active until the cast material becomes solid. Hereafter the bottom will remain in the position as shown in full lines in Fig. 3. An annulus H serves to chuck the blank body W to submit the same to the process of casting and to the operation of the die.

Fig. 4 represents a hot-plate embodying the novel method to prevent warping of the plate. The plate includes the two metal layers 1 and 2, the upper layer 1 having the larger and the lower layer 2 having the smaller coefficient of thermal expansion.

S. M.-steel for instance may be used for the upper layer, and cast iron for the lower layer which is nearest to the heating elements 3. These metals are merely chosen for example, and other suitable metals may be used likewise to form the plate, the only requirement being that the metal of the smaller coefficient be closer to the heating elements than the one having the higher coefficient.

It should be understood that a container embodying the improvements of this invention as well as a hot-plate embodying similar improvements may be used separately within the scope of this invention.

I claim:

1. In a cooking apparatus, a heat transferring portion consisting of two layers of metal rigidly anl non-shiftably secured to one another, the layer which lies next to the source of heat being of a metal having a lower coefficient of expansion than the layer more remote from the source of heat, the thicknesses of the two layers being so proportioned relative to their coefficients of expansion that the expansions of the two layers compensate one another.

2. In a cooking vessel, a bottom consisting of two layers of metal rigidly and non-shiftably secured to one another, the layer which lies next to the source of heat being of a metal having a lower coefficient of expansion than the layer more remote from the source of heat, the thicknesses of the two layers being so proportioned relative to their coefficients of expansion that the expansions of the two layers compensate one another.

3. In a cooking vessel, a bottom consisting of a layer of steel and a layer of cast iron rigidly and non-shiftably secured to one another, the layer of cast iron lying next to the source of heat, the thicknesses of the two layers being so proportioned relative to their coefficients of expansion that the expansions of the two layers compensate one another.

4. In a cooking vessel, a bottom comprising a layer of one metal and a layer of a second metal cast thereon, the metal next to the source of heat having a lower coefficient of expansion than the metal more remote from the source of heat, the thicknesses of the two layers being so proportioned relative to their coefficients of expansion that the expansions of the two layers compensate one another.

5. In a cooking vessel, a bottom comprising a layer of one metal and a layer of a second metal cast thereon, the metal next to the source of heat having a lower coefficient of expansion than the metal more remote from the source of heat, the thicknesses of the two layers being so proportioned relative to their coefficients of expansion that the expansions of the two layers compensate one another, and an annular collar surrounding said layers.

6. In a hot plate, the combination of heating elements, and a heat transferring portion consisting of two layers of metal rigidly and nonshiftably secured to one another, the layer nearest the heating elements having a lower specific thermal expansion than the layer more remote from the heating elements.

7. In a hot plate, electric heating elements, and a heat transferring portion consisting of two layers of metal rigidly and non-shiftably secured to one another, the layer which lies next to the source of heat being of a metal having a lower coefficient of expansion than the layer more remote from the source of heat, the thicknesses of the two layers being so proportioned relative to their coefficients of expansion that the expansions of the two layers compensate one another.

In testimony whereof I affix my signature.

ADOLF HAINLEN.